3,236,906
PROCESS FOR PREPARING ACETYLENE USING ATOMIC HYDROGEN TO HEAT THE REACTION
Irwin B. Margiloff, New York, N.Y., assignor to Halcon International, Inc., a corporation of Delaware
Filed May 11, 1962, Ser. No. 194,058
3 Claims. (Cl. 260—679)

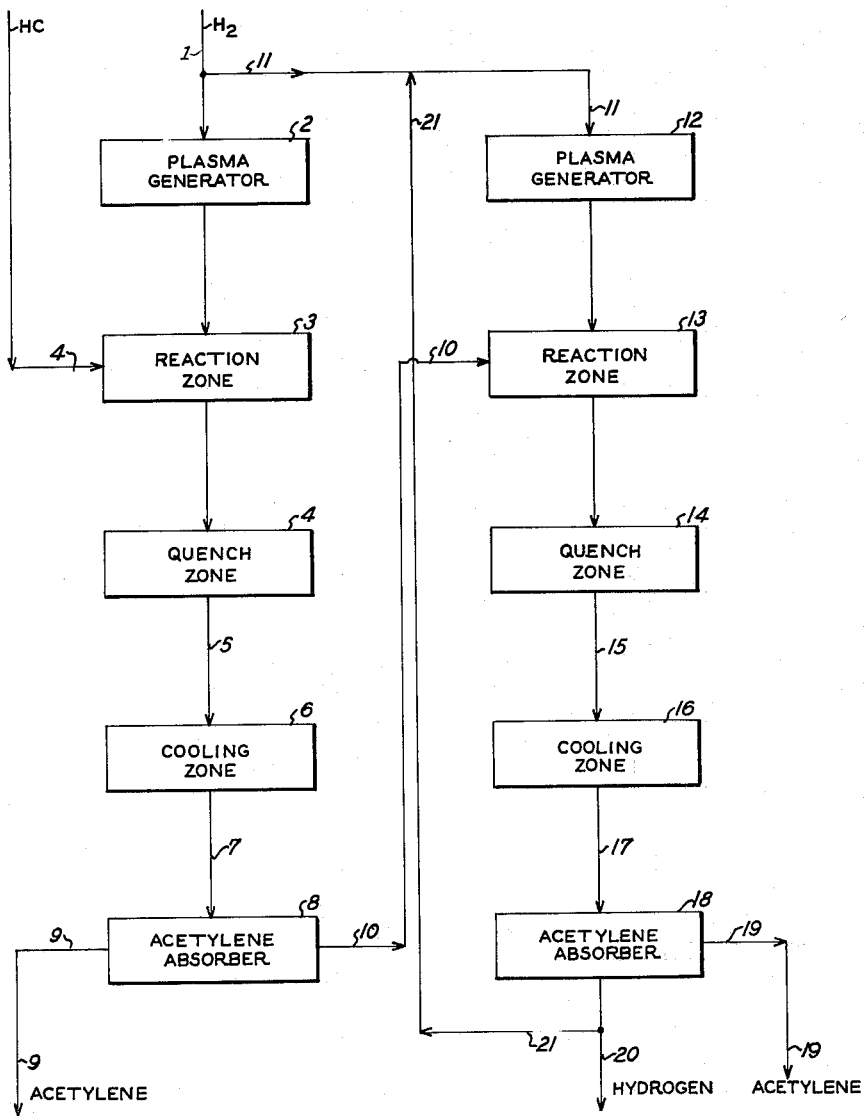

This invention relates to a new and improved process for the production of acetylene. More specifically, this invention relates to the production of acetylene employing a plasma arc to supply the heat required for the reaction.

Acetylene has been produced for many years by cracking of hydrocarbons, such as methane, ethane, propane, butane and pentane and higher aliphatic compounds. Large quantities of heat must be supplied to the reaction. This heat is frequently obtained by burning a portion of the hydrocarbon stream to supply heat.

In recent years, plasma arc technology has reached greater refinement and has been proposed for use in the preparation of acetylene. In these processes, gas, preferably hydrogen, is passed through an electric arc wherein the molecules of hydrogen are dissociated into atomic and ionic species. Shortly after the stream of hydrogen leaves the arc, the particles recombine. The great heat released upon this recombination results in extremely high temperatures, which are applicable in chemical process industries, and, when properly utilized, this energy is an ideal source of heat for the cracking of carbonaceous materials to form acetylene.

In using the plasma arc process for the preparation of acetylene, a key expense is the cost of hydrogen which is utilized in forming the plasma, i.e., dissociated particles. Since the hydrogen is not consumed in the reaction, and furthermore, since hydrogen is produced in the cracking process, it is obviously desirable to separate and recycle the hydrogen. However, the hydrogen needed must be of high purity because impurities tend to contaminate the electrodes of the plasma generator. Since the reaction of the carbonaceous matter is not 100% complete, it is necessary to separate this hydrogen from these hydrocarbons in addition to the acetylene separation. Because of the marked difference in the molecular natures of acetylene and other gases, separation of acetylene by means of absorption and other conventional techniques may be accomplished easily; however, the aliphatic and olefinic hydrocarbons, for separation purposes, closely resemble the hydrogen and cannot be readily removed unless costly procedures are employed. Therefore, this hydrogen formed in the process can not be utilized economically at the present time.

In accordance with this invention, it has been found that by using a dual reactor scheme high-purity hydrogen can be obtained which is suitable for recycle to the plasma torch.

More specifically, the reactor effluent, after quenching, cooling and acetylene separation, is used as the feed to a second reactor. The material leaving this second reactor, after the separation of acetylene, consists of substantially pure hydrogen, since the carbonaceous materials present are substantially converted to acetylene. This hydrogen is of adequate purity so that it may be passed directly to the plasma generators. Since there is a net production of hydrogen in the process, pure hydrogen may be purged from the system as a valuable by-product.

To more fully describe the instant invention, attention is directed to the attached figure. High purity hydrogen passes through line 1 into plasma generator 2 which consumes 50 kw. and is 90% efficient. The dissociated hydrogen thus produced passes to reaction zone 3 wherein it is contacted with a natural gas feed, preheated to about 1000° C., which enters the zone 3 via line 4. The mole ratio of hydrocarbon to hydrogen is about 1 to 1. In reaction zone 3 the dissociated hydrogen recombines and releases a large amount of heat energy. The reaction zone 3 reaches a temperature of about 1500° C. and cracks about 85% of the natural gas. The reaction mixture is immediately quenched in zone 4 to a temperature of about 100° C. While the plasma generator 2, reaction zone 3 and quenching zone 4 are shown as separate units, it is to be understood that conventionally these zones would be combined so as to permit the introduction of the hydrocarbon into the appropriate point of the plasma stream and to allow the reaction product to be quenched at a predetermined time shortly after its formation. The quenched reaction product passes via line 5 to cooling zone 6 wherein it is cooled to about 20° C. and then passed via line 7 to acetylene absorber 8. Acetylene is absorbed in a conventional selective solvent such as N-methyl pyrrolidone or butyrolactone. The absorbed acetylene leaves the absorber 8 via line 9 and a non-absorbed stream consisting essentially of unreacted and by-product hydrocarbons saturated hydrocarbons and hydrogen is removed via line 10. This stream has too high a content of hydrocarbons to be used as the source of plasma hydrogen. Hence, in accordance with this invention, it is preheated and passed to the second reaction zone 13 wherein it is brought into contact with high purity hydrogen of high energy content obtained from a second plasma generator 12. Hydrogen is conveyed to the second plasma generator via line 11. The operating conditions in this stage are essentially the same as in the first stage. However, a larger ratio of hydrogen is present. In the second reaction zone 13, about 80% of the remaining hydrocarbons present in the gas stream from acetylene absorber 8 is cracked to form acetylene. The second reaction product is quenched in a quenching zone 14 and passed via line 15 to cooling zone 16. The effluent from the cooling zone passes via line 17 to acetylene absorber 18 wherein acetylene is removed through line 19 and hydrogen through line 20. This hydrogen is of sufficient purity to be recycled through line 21 to the plasma generators 2 and 12, since it contains only about 2% of hydrocarbon contaminants. Excess hydrogen is purged via line 20.

It can be readily seen that the instant invention yields both a highly efficient process for the conversion of carbonaceous materials such as saturated hydrocarbons to acetylene as well as providing a constant by-product stream of high purity hydrogen. Such procedures clearly overcome one of the greatest problems presented by the prior art.

The above illustration is only exemplary of the instant invention and is not to be considered as definitive.

Though the acetylene separation is shown in a single unit, it will be understood by those skilled in the art that multiple units may be employed. For example, if desired, the higher acetylenes formed in the process may be first absorbed and acetylene then absorbed, or, for that matter, separated by any of the well known techniques, thereafter.

The hot reaction mass containing acetylene must be quenched rapidly in order to prevent the formation of carbon deposits. While generally the mass is sprayed with a liquid, such as water, any rapid cooling technique may be employed.

Since electrical heating is generally uneconomical for heating to comparatively low temperatures, it is preferred to preheat both the hydrogen and feed by conventional indirect contact with combustion gases. However, it will be realized that the total heating requirements can be achieved electrically.

Typically, in the first reactor, from 0.1 to 2 moles of hydrogen per mole of carbonaceous material are introduced. The reaction takes place at temperatures of from 1200 to 1600° C. Energy consumption of the plasma generator is dependent on the temperature of the incoming molecular hydrogen, the degree of dissociation desired and the feed rate. These factors can be readily determined by those familiar with the art. For example, see U.S. Patent 2,916,534.

Generally the process can be operated with conversions of from 60 to 95 wt. percent based on the carbon in the feed to each reactor. The selectivity to acetylene depends on the particular carbonaceous material in the feed, the temperatures of the reaction and the timing and completeness of the quench.

As has already been noted, the feed to the second reaction contains greater relative amounts of hydrogen than does the feed to the first reactor. This necessitates only that minor changes from first stage conditions be used in the second stage. Thus, for example, the hydrogen passing through the second plasma generator should be brought to a somewhat higher temperature than is that leaving the first stage generator before mixing with the second stage reactor feed. This, as is obvious to any skilled in the art, is required in order to adequately raise the temperature of the excess hydrogen in the second reactor feed. Alternatively, a greater amount of hydrogen can be dissociated.

While the main objects of the instant invention is first, the provision of an easily recyclable hydrogen for the plasma generator feed and secondly, the production of high purity hydrogen in conjunction with the acetylene process, a secondary advantage is achieved; namely, a more complete conversion of the hydrocarbon feed to acetylene is obtained.

A wide variety of carbonaceous feeds may be employed in the process. Preferably, the paraffins having from 1 to 12 carbon atoms are used. Additionally, other feed materials are applicable, as, for example, pulverized carbon, hydrocarbon amines and olefins.

If desired, a third stage, similar to the first two, can also be added in order to increase purity of the produced hydrogen even further. For this purpose, a third stage reactor may, if desired, be eliminated. When this is done, it is adequate simply to pass the hydrogen being produced which may contain 2% of hydrocarbon impurity directly through a plasma generator, quenching it rapidly thereafter, and passing the effluent quenched hydrogen stream through an absorber system to remove additionally formed acetylene. As is obvious, the choice between a third stage with reactor, a third stage without reactor which requires increased amounts of gas to be directly heated in a plasma generator, and no third stage at all will be determined, in any given case, by considerations of relative power costs, costs of additional capital equipment and the need for hydrogen of the highest purity.

It will be understood that modifications and variations may be affected without departing from the spirit of the invention.

I claim:

1. A process for the preparation of acetylene and substantially pure by-product molecular hydrogen from hydrocarbons which comprises: thermally splitting molecular hydrogen by passage through a plasma generator to form high temperature dissociated hydrogen; admixing said high temperature dissociated hydrogen with a gas containing hydrocarbons; thermally cracking a portion of said hydrocarbons by the heat liberated from the combination of said dissociated hydrogen atoms; quenching said admixture; withdrawing a first reactor effluent containing acetylene, unreacted and by-product hydrocarbons, and molecular hydrogen; separating said acetylene; withdrawing a stream containing the remaining portion of said first reactor effluent; thermally splitting another portion of molecular hydrogen by passage through a plasma generator to form another portion of high temperature dissociated hydrogen; admixing said remaining portion with said other portion of high temperature dissociated hydrogen; thermally cracking a portion of the hitherto unreacted and by-product hydrocarbons by the heat liberated from the combination of said second portion of high temperature dissociated hydrogen; quenching said last named admixture; withdrawing a second reactor effluent containing acetylene, trace amounts of unreacted and by-product hydrocarbons, and molecular hydrogen; separating said acetylene, and thereby obtaining a by-product of substantially pure molecular hydrogen.

2. The process of claim 1 wherein said hydrocarbons are paraffins having from 1 to 12 carbon atoms per molecule.

3. The process of claim 2 wherein said paraffin contain methane.

References Cited by the Examiner

UNITED STATES PATENTS

| | | | |
|---|---|---|---|
| 1,904,426 | 4/1933 | Eisenhut | 204—171 |
| 2,236,978 | 4/1941 | Taylor | 260—679 |
| 2,916,534 | 12/1959 | Shallus et al. | 260—679 |
| 2,974,180 | 3/1961 | Koble et al. | 260—679 |
| 3,026,969 | 3/1962 | Braconier et al. | 260—679 |
| 3,051,639 | 8/1962 | Anderson | 260—679 |
| 3,060,247 | 10/1962 | Wolfram et al. | 260—679 |

ALPHONSO D. SULLIVAN, *Primary Examiner.*

JOSEPH R. LIBERMAN, *Examiner.*